US010664303B2

(12) United States Patent
Miller

(10) Patent No.: US 10,664,303 B2
(45) Date of Patent: *May 26, 2020

(54) NETWORK MANAGEMENT FOR ELASTIC VIRTUAL NETWORK FUNCTIONS

(71) Applicant: Genband US LLC, Plano, TX (US)

(72) Inventor: Paul Miller, Derry, NH (US)

(73) Assignee: Genband US LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/200,108

(22) Filed: Nov. 26, 2018

(65) Prior Publication Data
US 2019/0196856 A1 Jun. 27, 2019

Related U.S. Application Data

(63) Continuation of application No. 15/331,571, filed on Oct. 21, 2016, now Pat. No. 10,140,146.

(60) Provisional application No. 62/245,115, filed on Oct. 22, 2015.

(51) Int. Cl.
G06F 9/455 (2018.01)
H04L 12/46 (2006.01)
H04L 12/24 (2006.01)
G06F 9/50 (2006.01)
H04L 12/26 (2006.01)
H04L 12/725 (2013.01)

(52) U.S. Cl.
CPC ........ *G06F 9/45558* (2013.01); *G06F 9/5077* (2013.01); *H04L 12/4641* (2013.01); *H04L 41/0896* (2013.01); G06F 2009/4557 (2013.01); G06F 2009/45595 (2013.01); *H04L 43/0817* (2013.01); *H04L 43/16* (2013.01); *H04L 45/306* (2013.01)

(58) Field of Classification Search
CPC ..... G06F 2009/4557; G06F 2209/5022; G06F 9/5083; H04L 41/0896; H04L 41/0813; H04L 41/0823; H04L 41/0893; H04L 41/20; H04L 47/12; H04W 28/08
See application file for complete search history.

(56) References Cited

U.S. PATENT DOCUMENTS

| | | | |
|---|---|---|---|
| 2014/0129700 A1* | 5/2014 | Mehta | H04L 43/0817 709/224 |
| 2014/0280488 A1* | 9/2014 | Voit | H04L 67/10 709/203 |
| 2015/0180730 A1* | 6/2015 | Felstaine | H04L 41/022 709/225 |

(Continued)

*Primary Examiner* — Dong U Kim
(74) *Attorney, Agent, or Firm* — Haynes and Boone, LLP

(57) ABSTRACT

A method includes, with a Virtual Network Function (VNF) manager that manages a VNF that includes plurality of VNF components running on a plurality of virtual machines, determining that an additional VNF component should be provisioned on an additional virtual machine. The method further includes, in response to the determining that the additional VNF component should be provisioned, instructing a compute controller to provision the additional virtual machine. The method further includes instructing a Software-Defined Networking (SDN) controller to connect the additional virtual machine to a network that interconnects the VNF components, and provisioning the additional VNF component on the additional virtual machine.

20 Claims, 6 Drawing Sheets

(56) References Cited

U.S. PATENT DOCUMENTS

| | | | | |
|---|---|---|---|---|
| 2015/0358248 | A1* | 12/2015 | Saha | H04L 43/0817 |
| | | | | 709/226 |
| 2016/0277509 | A1* | 9/2016 | Qiang | H04L 67/16 |
| 2016/0328259 | A1* | 11/2016 | Xia | G06F 9/45558 |
| 2016/0373474 | A1* | 12/2016 | Sood | H04L 63/1425 |
| 2017/0150399 | A1* | 5/2017 | Kedalagudde | H04W 28/08 |
| 2017/0257276 | A1* | 9/2017 | Chou | H04L 41/0823 |

* cited by examiner

NETWORK MANAGEMENT FOR ELASTIC VIRTUAL NETWORK FUNCTIONS

PRIORITY INFORMATION

This application is a continuation of U.S. patent application Ser. No. 15/331,571 filed Oct. 21, 2016 which claims benefit to Provisional Application No. 62/245,115 filed Oct. 22, 2015 and entitled "Network Management for Elastic Virtual Network Functions," the disclosures of which are hereby incorporated by reference in their entireties.

BACKGROUND

The present disclosure relates generally to Network Functions Virtualization (NFV), and more particularly to methods and systems for managing networks for elastic Virtual Network Functions (VNFs).

NFV is a concept that involves virtualization of various telecommunication functions that are then interconnected to provide telecommunication services. Particularly, specific telecommunication functions that are typically performed by specialized pieces of hardware are replaced with a virtualization of such hardware. One example of such hardware is a Session Border Controller (SBC). The virtualized functions that would otherwise be performed by such hardware are referred to as Virtual Network Functions (VNFs).

NFV can utilize various computing and networking technologies such as cloud computing and Software-Defined Networking (SDN). Cloud computing typically involves several physical computing systems that, through the use of a hypervisor, present virtual machine environments for use by guest operating systems. The guest operating systems can run applications as a physical computing system does. Applications related to VNFs can be run on such guest operating systems.

SDN is an approach to networking that separates the control plane from the data plane. By contrast, a legacy system may include several independently configured routers, whereas a system implementing SDN may include a central management component that makes decisions as to where traffic should be sent and then directs underlying systems to route network traffic as appropriate. SDN concepts can be used in the physical networks that interconnect the physical computing systems that provide a virtual machine environment.

SUMMARY

A method includes, with a Virtual Network Function (VNF) manager that manages a VNF that includes plurality of VNF components running on a plurality of virtual machines, determining that an additional VNF component should be provisioned on an additional virtual machine. The method further includes, in response to the determining that the additional VNF component should be provisioned, instructing a Virtual Infrastructure Manager (VIM) to provision the additional virtual machine. The method further includes instructing a Software-Defined Networking (SDN) controller to connect the additional virtual machine to a network that interconnects the VNF components, and provisioning the additional VNF component on the additional virtual machine.

A method includes managing a Virtual Network Function (VNF) that includes a plurality of VNF components, the VNF components being interconnected over a network. The method further includes, in response to utilization of current capacity of the VNF exceeding a defined threshold, instructing a Virtual Infrastructure Manager (VIM) to provision an additional virtual machine. The method further includes instructing a Software-Defined Networking (SDN) controller to connect the additional virtual machine to the network and provisioning an additional VNF component on the additional virtual machine.

A system includes a processor and a memory comprising machine readable instructions that when executed by the processor, cause the system to manage a Virtual Network Function (VNF) that includes a plurality of VNF components, the VNF components being interconnected over a network. The system is further to instruct a Virtual Infrastructure Manager (VIM) to provision an additional virtual machine in response to utilization of current capacity of the VNF exceeding a defined threshold, instruct a Software-Defined Networking (SDN) controller to connect the additional virtual machine to the network, and provision an additional VNF component on the additional virtual machine.

BRIEF DESCRIPTION OF THE DRAWINGS

Aspects of the present disclosure are best understood from the following detailed description when read with the accompanying figures.

Figure 1:
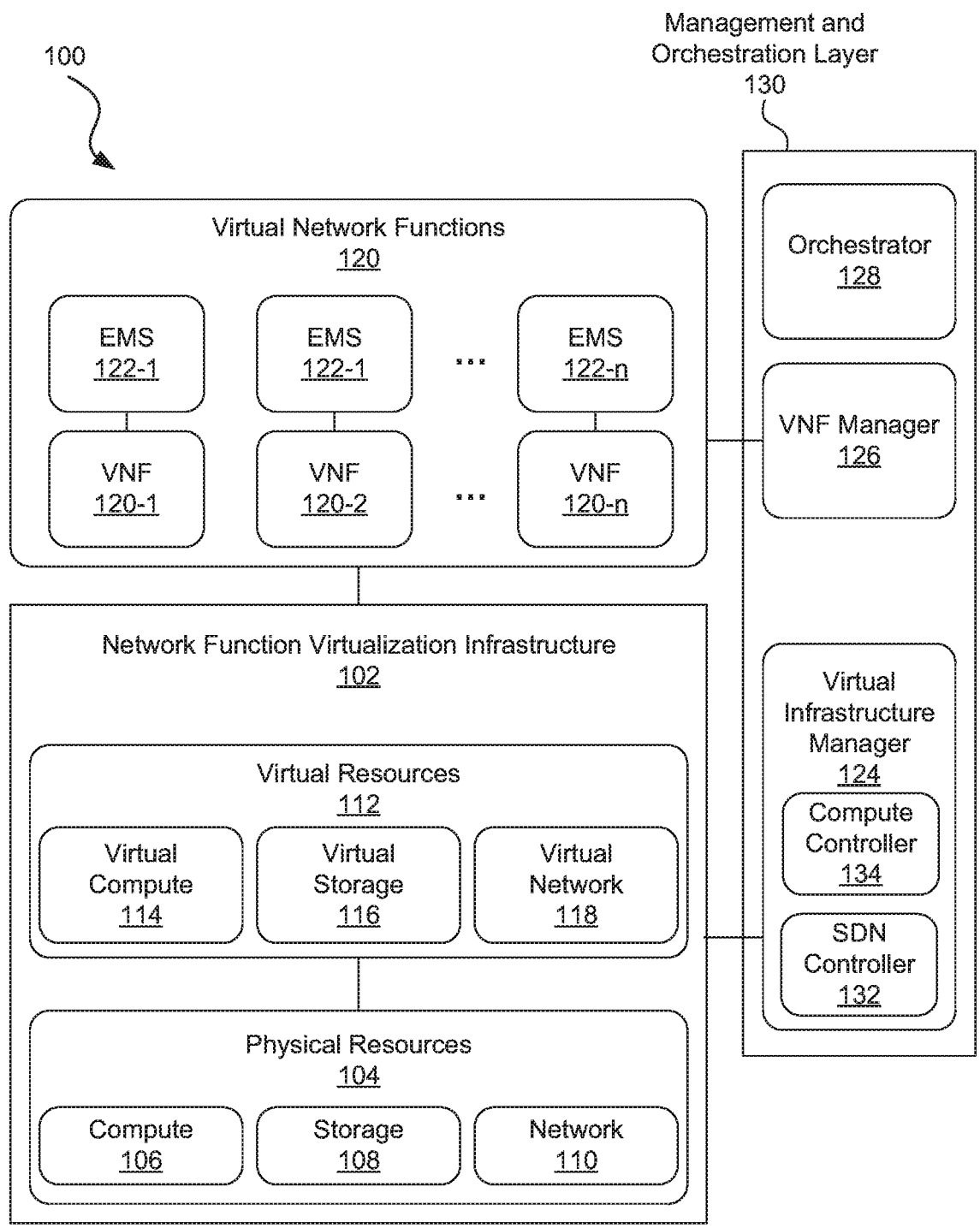
FIG. 1 is a diagram showing network function virtualization, according to one example of principles described herein.

In the figures, elements having similar designations may or may not have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, NFV utilizes several virtual machines in a cloud computing environment to perform telecommunication functions that were previously provided by specialized pieces of hardware. One benefit of NFV is that it provides elasticity. A VNF typically includes several VNF components. In some cases, each VNF component may be running on a different virtual machine. In some cases, some VNF components may be similar instances of the same application. Such instances may handle up to a certain capacity of telecommunication services. As demand for services changes, the number of VNF components can change as well. For example, if demand increases to a certain percentage of overall capacity for the VNF, an additional VNF component can be created to increase the overall capacity of the VNF. Conversely, if demand decreases below a certain percentage of overall capacity for the VNF, a VNF component can be removed. This frees up computing resources for other applications within the cloud computing environment.

According to principles described herein, when a new VNF component is created, an SDN controller is used to connect that VNF component to other VNF components and other network components to allow for efficient and full operation of the new VNF component. For example, there may be one VNF component that acts as a database for all other VNF components. There may be another VNF component that acts as a load balancer for other VNF components. The new VNF component is connected to such other VNF components through use of the SDN controller.

In one example, after a new virtual machine is provisioned for use by a VNF component, a VNF manager instructs the SDN controller to connect the new virtual machine to the network that interconnects the VNF components. Such network may be a virtual network that provides connections between the VNF components as well as a connection to external network components being served by the VNF. The SDN controller connects the new virtual machine to the other VNF component by creating traffic flow rules for various components of the virtual network. The VNF manager can then provision the new VNF component on the new virtual machine.

Using SDN in this manner to interconnect new VNF components provides various advantages. For example, it allows the elasticity of a VNF to be utilized more efficiently. This, in turn, consumes less computing resources and less human administration resources.

FIG. 1 is a diagram showing network function virtualization 100. According to the present example, a Network Function Virtualization Infrastructure (NFVI) 102 is used to provide network function virtualization 100. The NFVI 102 provides the infrastructure for a number of VNFs 120. Both the VNFs 120 and the NFVI 102 are managed by an NFV management module 130.

The NFVI 102 includes a set of physical resources 104 that are used to provide a set of virtual resources 112. The physical resources 104 include computing resources 106, storage resources 108, input/output resources, and network resources 110. The physical resources 104 are typically embodied as a plurality of physical computing systems, sometimes referred to as servers, within a datacenter. For example, a datacenter may include several servers that are positioned on racks and interconnected via physical network cables. Each of the servers includes hardware including a physical processor, a memory, and a network interface. Some servers may be designed primarily for processing power and some servers may be designed primarily for storage. In one example, the servers are commodity servers that include a number of physical processors, such as x86 processors. The servers utilize an operating system, such as Linux, to provide various applications with access to the hardware of the servers. More specifically, the operating system will schedule processing tasks on the physical processor of the server and allocate physical memory for use by the application.

The computing resources 106 include a plurality of processors within a plurality of physical computing systems. The processors are designed to process machine readable instructions to perform specifically designed tasks. The processors can be designed to work together to provide parallel processing capabilities.

The storage resources 108 include various types of memory. Some types of memory, such as non-volatile types of memory, typically have large storage volume but relatively slow performance. The storage resources 108 may include a series of hard disk drives or solid state drives that store data in the form of machine readable instructions as well as large amounts of data. The storage resources 108 may also include volatile forms of memory, such as those used for Random Access Memory (RAM), which are optimized for speed and are often referred to as "working memory."

The network resources 110 include the physical network infrastructure that provides communication between the physical computing systems as well as to an external network such as the Internet. The physical network infrastructure includes the physical cables, such as Ethernet or fiber optic, that connect the physical systems to routers, switches, and other networking equipment that provides the desired interconnectivity.

The physical resources 104 use hypervisors to provide a virtual computing environment that provides the virtual resources 112. Specifically, the hypervisors provide virtual hardware to guest operating systems. A physical computing system may provide one or more virtual machines for use by guest operating systems. The virtual resources 112 include virtual computing resources 114, virtual storage resources 116, and virtual network resources 118. Such virtual resources 112 may emulate their underlying physical resource counterparts.

The virtual computing resources 114 include virtual processors that execute machine readable instructions as a physical processor does. The hypervisor then maps the execution of those instructions to execution of instructions on a physical processor. The architecture of the virtual processor does not necessarily have to match the architecture of the underlying physical processor, which allows a variety of instruction set architectures to be used for various virtual machines.

The virtual storage resources 116 include short term and long term storage services. Specifically, the virtual machines may include virtual memory that is then mapped to physical memory by the hypervisor. There does not necessarily have to be a one-to-one mapping of virtual memory to physical memory. For example, two gigabytes of virtual working memory may be mapped to only one gigabyte of working memory in the physical system. Various paging techniques are then used to swap physical memory from working memory to a volatile storage memory to allow for such mapping.

Each virtual machine may run a guest operating system. The guest operating system may be similar to a host operating system. For example, the guest operating system may also be Linux. The guest operating system runs applications and provides such applications with access the virtual hardware of the virtual machines. For example, the guest operating system schedules processing tasks associated with the applications on the virtual processor. The guest operating system also provides the application with access to virtual memory associated with the virtual machines.

When the guest operating system provides applications running thereon with access to the virtual resources, the hypervisor of the underlying physical computing systems then maps those resources to the underlying physical resources. For example, when an application running on the guest operating system stores data in virtual memory, the hypervisor uses a translates a virtual memory address into a physical memory address and the data is stored at that physical memory address. When the guest operating system schedules processing tasks for execution on the virtual processor, the hypervisor translates those processing tasks into executable instructions for the physical processor.

The virtual machines that are provided as part of the virtual resources 112 can be interconnected to each other through one or more virtual networks that make up the virtual networking resources 118. Such virtual networks emulate physical networks. Virtual networks may include a number of machines, both physical and virtual, that are assigned a virtual network address. The virtual networks can also isolate sets of virtual machines as desired. This can be helpful if some virtual machines are owned and/or operated by one entity and other virtual machines are owned and/or operated by another entity.

The NFVI 102 is managed by a virtual infrastructure manager 124, which is part of the NFV management module 130. The infrastructure manager 124 may include hardware, software, or a combination of both to perform various management functions. For example, the infrastructure manager 124 may be an application that resides on one or more physical machines and can receive input from human administrators as well as other management functions. The infrastructure manager 124 can then manage the physical and virtual environment as appropriate. For example, if it is determined that more virtual machines are desired, then the infrastructure manager 124 can send an instruction to the NFVI to create an additional virtual machine and configure it for use by whatever entity uses that virtual machine. Additionally, the infrastructure management can cause the physical computing systems to enter standby mode if less physical computing power is desired. The infrastructure manager 124 can also take such physical computing systems out of standby mode when more computing power is desired.

In the present example, the virtual infrastructure manager 124 includes two components. Specifically, the infrastructure manager 124 includes a compute controller 134 and an SDN controller 132. The compute controller 134 is responsible for managing the cloud computing environment provided by the virtual resources 112 of the NFVI 102. One example of a virtual infrastructure manager 134 includes the open-source cloud computing software platform provided by the Openstack Foundation under the name OpenStack™.

The SDN controller 132 is used to control the network resources of the NFVI 102. The SDN controller 132 may control both the physical network resources 110 and the virtual network resources 118. As will be described in further detail below, the SDN controller 132 receives instructions from various applications for how to configure the network infrastructure.

As described above, a VNF 120 represents a virtualization of specific telecommunication functions that are typically performed by specialized pieces of hardware. Examples of a VNF 120 include, but are not limited to, an SBC, an Internet Protocol (IP) Multimedia Subsystem (IMS) network function, or a telephony application server. A VNF 120 may include a number of components, or instances of an application, that run within the virtual machine environment. Such applications are designed to emulate the specialized pieces of telecommunication hardware. Thus, instead of setting up a new physical piece of specialized equipment, a service provider can simply spin up a virtual machine environment and run applications. Each VNF 120 has a corresponding Element Management System (EMS) 122. The EMS 122 includes a user interface, or a dashboard, that allows an administrator to configure the VNF 120 as desired. To provide full NFV, several VNFs work together to provide the desired services. In the present example, a plurality of VNFs 120-1, 120-2 . . . 120-$n$ and corresponding EMSs 122-1, 122-2 . . . 122-$n$ are used to provide network functions within NFV.

A VNF 120 typically includes several different components, which may or may not be identical, that together form the full VNF 120. For example, the different components may be different instances of the VNF application. The different instances then work together to provide the functionality of the full VNF 120. Multiple VNFs 120 are then used in concert to provide a telecommunication network for a telecommunication service. A telecommunications network is an infrastructure that provides communication services between multiple subscribers. One example of a communication service is a Voice over IP (VoIP) service. Such services typically include several pieces of specialized hardware that perform specific network functions. However, according to principles described herein, the VNF 120 provides such functions instead of a specialized piece of hardware.

A VNF 120 may be part of a telecommunications core network. The core network is the central part of a telecommunications networks. The core network provides various communication services to the subscribers such as voice communication. Subscribers are connected to the core network through an access network, which will be described in further detail below.

The VNFs 120 are managed by a VNF manager 126, which is part of the VNF management module 130. In some cases, there may be multiple VNF managers 126, each managing one or more specific VNFs 120. The VNF manager 126 can manage the VNFs based on network demand. For example, at peak times, the VNF manager 126 can start up new instances of VNF components to scale dynamically according to demand. While there may be several VNF managers 126, there is a single orchestrator 128 that manages the VNF managers 126 and thus manages the entire NFV service.

Figure 2:
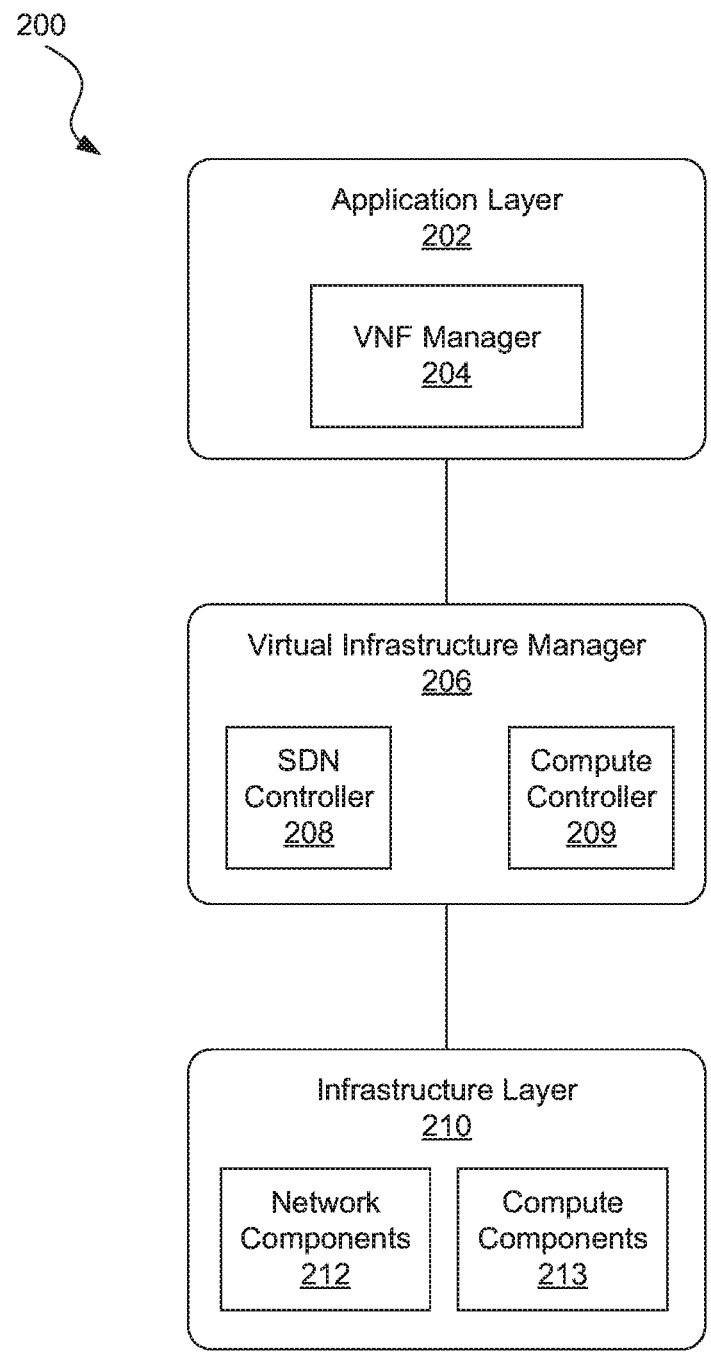
FIG. 2 is a diagram showing software-defined networking, according to one example of principles described herein.

FIG. 2 is a diagram showing software-defined networking 200. As described above, SDN 200 is a concept in which the control plane is separated from the data plane each of which is under software control. Accordingly, SDN 200 includes an infrastructure layer 210, a virtual infrastructure manager 206, and an application layer 202. The infrastructure layer 210 includes a number of network components 212. Such network components 212 may include physical routers, switchers, and other packet handling hardware. The infrastructure layer 202 thus includes the resources to move data packets between different computing systems. The infrastructure layer 210 also includes compute components 213 that process data.

In a virtual computing environment, different virtual machines may be interconnected over a virtual network. The virtual network may include virtual routers, virtual switches, and other virtual hardware that is used to handle data packets. Such virtual hardware may also be included within the network components 212 that make up the infrastructure layer 210.

The network components 212 of the infrastructure layer 210 are in communication with an SDN controller 208 of the virtual infrastructure manager 206. The SDN controller 208 corresponds to the SDN controller 132 described above. The SDN controller 208 instructs each of the network components 212 how to direct network traffic. For example, the SDN controller 208 can provide a network component 212 with forwarding tables that instruct the network component 212 how to forward data packets headed for certain destinations. The SDN controller 208 is able to quickly and dynamically manage and adjust the network of the underlying infrastructure layer 202. The SDN controller 208 abstracts the implementation of network management to applications within the application layer 202. The virtual infrastructure manager 206 also includes a compute controller 209 that corresponds to the compute controller 134 described above.

The application layer 202 includes the applications that interface with the virtual infrastructure manager 206 to instruct an SDN controller 208 how a network should be configured. Specifically, the SDN controller 208 provides an Application Programming Interface (API) to applications of the application layer 202. The applications instruct the SDN controller 208 how to configure the network for the purposes of the applications. In the present example, one of the applications in the application layer 202 is a VNF manager 204. The VNF manager 204 corresponds to the VNF manager 126 described above.

As will be described in further detail below, the VNF manager 204 can communicate with the SDN controller 208 and instruct the SDN controller 208 to establish new connections between a new virtual machine and other various virtual machines associated with a VNF (e.g. 120, FIG. 1). The precise details for such connections are abstracted by the SDN controller 208 from the VNF manager 204. Such virtual machines and other components of the virtual network that interconnect the virtual machines are part of the infrastructure layer 202.

Figure 3:
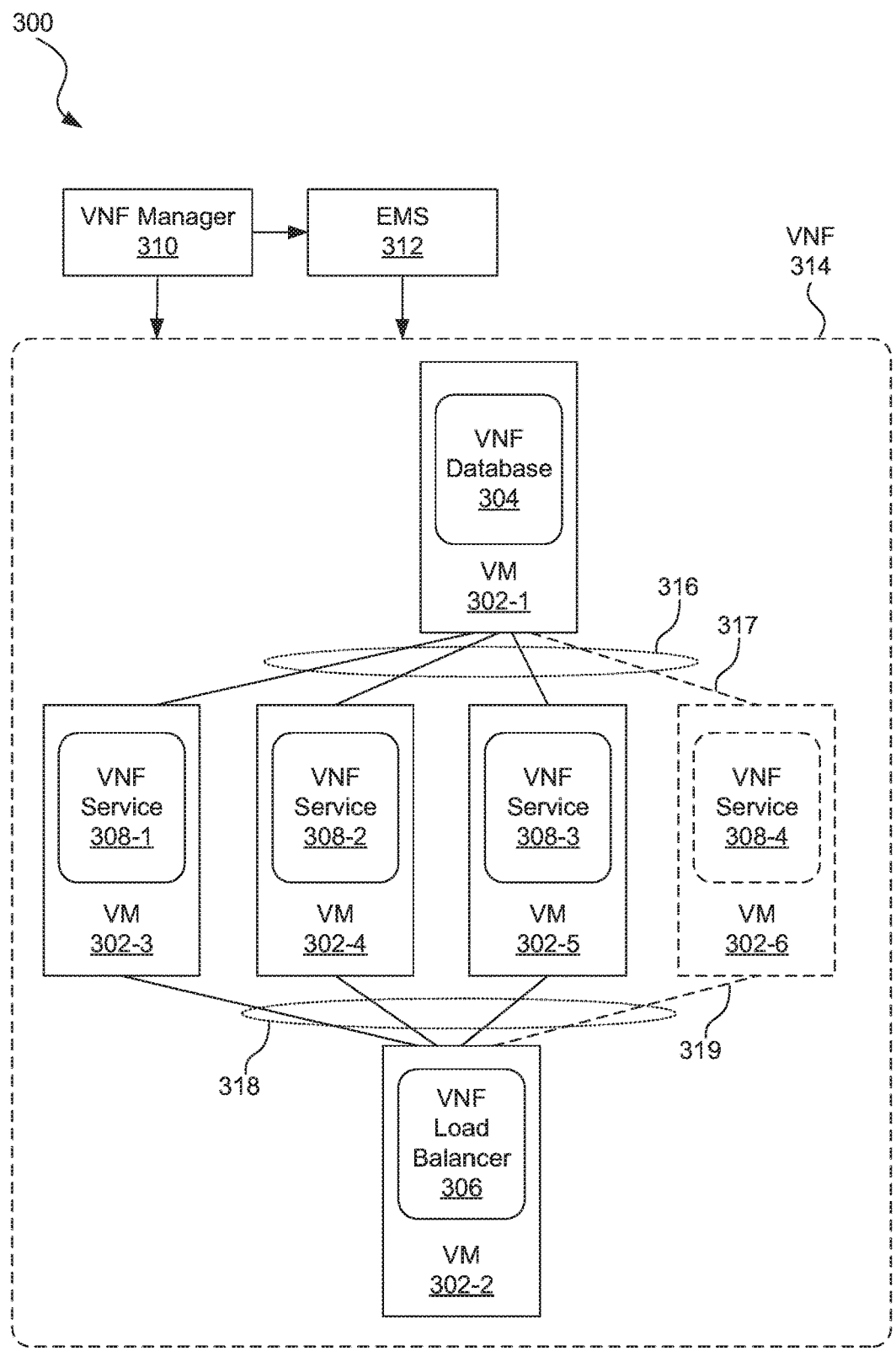
FIG. 3 is a diagram showing elasticity of VNF components, according to one example of principles described herein.

FIG. 3 is a diagram showing elasticity of VNF components. According to the present example, a VNF 314 is managed by a VNF manager 310. The VNF manager 310 is in communication with an EMS 312. The VNF manager 310 corresponds to the VNF managers 126, 204 described above. The VNF 314 includes a number of VNF components 304, 306, 308. There are different types of VNF components 304, 306, 308. Specifically, the VNF 314 includes a database component 304, a load balancer component 306, and a plurality of service components 308. Each VNF component 304, 306, 308 may run on a different virtual machine 302. The VNF components illustrated herein are examples. Other types of VNF components may be used in accordance with principles described herein.

In the present example, the database component 304 runs on virtual machine 302-1. The database component 304 stores a variety of data that is used by other VNF components. For example, the database component 304 may include subscriber related data for at least a subset of the subscribers of the telecommunication service associated with the VNF 314. While only a single database component 304 is shown, some examples may include additional database components 304. The database component 304 is connected to the service components 308 through connections 316. The connections 316 are part of a virtual network associated with the VNF 314.

In the present example, the load balancer component 306 runs on virtual machine 302-2. The load balancer component 306 balances the workload of the VNF 314 between the service component instances 308. The load balancer component 306 may also act as an access point between the core network to which the VNF 314 belongs and the access network. The access network is the part of a telecommunications network that connects a subscriber's communication device (e.g., a phone, cellular phone, or computer) to the core network. While only a single load balancer component 306 is shown, some examples may include additional load balancer components 306. The load balancer component 306 is connected to the service instances through connections 318. The connections 318 are part of the virtual network associated with the VNF 314.

In the present example, there are three service component instances 308-1, 308-2, 308-3. Service component instance 308-1 runs on virtual machine 302-3. Service component instance 308-2 runs on virtual machine 302-4. Service component instance 308-3 runs on virtual machine 302-5. The service component instances 308 perform the primary servicing functions of the VNF 314. Thus, when more subscribers are using the telecommunication service associated with the VNF 314, a greater percentage of the capacity of the VNF 314 becomes fuller.

According to one example, when utilization of the VNF 314 exceeds a certain percentage of total capacity, the VNF 314 can scale to handle the additional demand for services. For example, if the VNF 314 reaches 80 percent of total capacity, the VNF 314 can start up an additional service component instance 308-4 to increase the total capacity of the VNF 314. Conversely, if the utilization of capacity drops below a defined threshold, such as 50 percent, then one of the service component instances 308 can be decommissioned.

When a new virtual machine 302-6 is created for the purpose of running a new VNF component 308-4, new connections 317, 319 are established to connect that new virtual machine 302-6 to other virtual machines 302-1, 302-2 that run other VNF components. Specifically, the new virtual machine 302-6 is connected to the virtual machines 302-1, 302-2 that run the database component 304 and the load balancer component 306. These connections are established by the SDN controller (e.g. 208, FIG. 2) at the request of the VNF manager (e.g. 204, FIG. 2). The automatic establishment of the connections 317, 319 through use of the SDN controller allows for the elasticity of the VNF 314 to perform more efficiently. This consumes fewer resources and thus allows the underlying physical systems to operate more efficiently.

Figure 4:
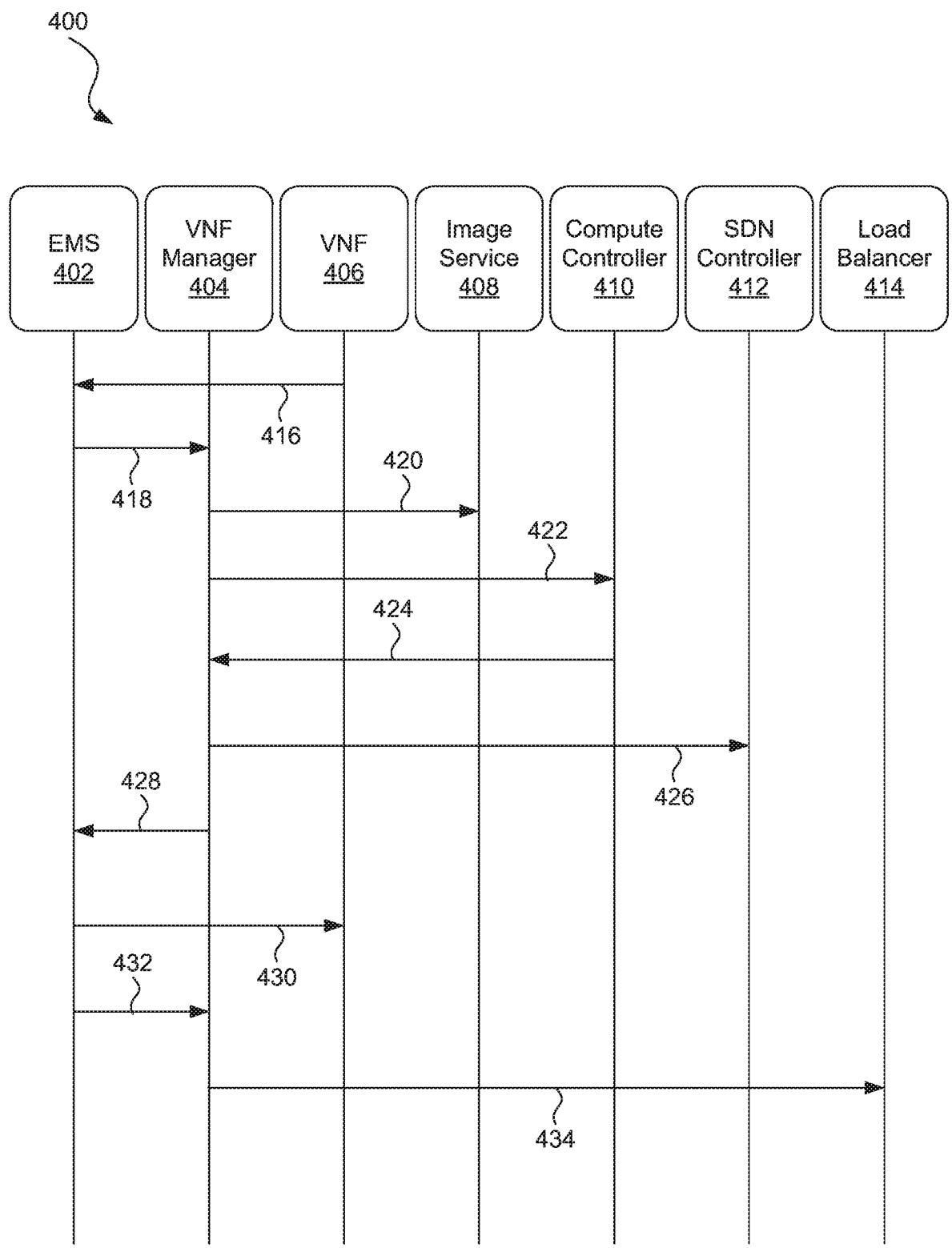
FIG. 4 is a signal diagram showing an illustrative method for establishing network connections to dynamically created VNF components, according to one example of principles described herein.

FIG. 4 is a signal diagram showing an illustrative method for establishing network connections to dynamically created VNF components. According to the present example, the method 400 involves an EMS 402, a VNF manager 404, a VNF 406, an image service 408, a compute controller 410 of a virtual infrastructure manager, an SDN controller 412, and a load balancer 414. The EMS 402 corresponds to the EMS 122 described above. The VNF manager 404 corresponds to the VNF manager 124 described above. The VNF 406 corresponds to the VNF 120 described above. The compute controller 410 corresponds to the compute controller 134 described above. The SDN controller 412 corresponds to the SDN controller 132 described above. The load balancer 414 corresponds to the load balancer component 306 described above.

According to the present example, the VNF 406 reports various statistics to the EMS 402 via signal 416. Such statistics relate to performance of the VNF 406. In some cases, various alarms may be used to notify the EMS 402 of various situations. For example, if the VNF 406 reaches 80 percent of capacity, the VNF 406 can notify the EMS 402 of such event via signal 416. Communication between the VNF 406 and the EMS 402 may be done through various protocols and architectural styles, including, but not limited to, Simple Object Access Protocol (SOAP), eXtensible Markup Language (XML), Simple Network Management Protocol (SNMP), and Representational State Transfer (REST).

The EMS 402 processes the data received from the VNF 406 and provides relevant processed data to the VNF manager 404 via signal 418. The relevant processed data may be transferred in one of a variety of ways. In one example, the VNF manager 404 subscribes to certain points of data that are of interest. For example, the VNF manager 404 may wish to know when capacity of the VNF reaches a predefined threshold, such as 80 percent. In another example, the VNF may send signal 416 directly to the VNF Manager. The VNF manager 404 may wish to know this information so that it can provision another service component (e.g. 308, FIG. 3). The VNF manager 404 may also wish to know when capacity drops below a predefined threshold, such as 50 percent. The VNF manager 404 may wish to know this information so it can decommission an instance to save costs and free up computing resources for other applications. While the present example involves thresholds of 50 percent and 80 percent, it is understood that other thresholds may be used as desired. In some examples, a VNF communicates directly to the VNF manager. In other words, signal 416 is sent both to the EMS, and to the VNF manager. Then, the VNF manager can make better real-time decisions because it is directly monitoring the VNF without going through the EMS.

After the VNF manager 404 determines that a new service instance is to be provisioned, it prompts the image service 408 to verify that the proper virtual machine image is available via signal 420. The image service 408 provides discovery, registration, and delivery services for physical and virtual machine images. In some examples, the image service 408 does not store images itself. Instead, the image service 408 maintains a catalog of images and can provide client systems with storage locations of such images. One example of an image store is OpenStack Foundation's service provided under the name Glance™. In one example, the virtual machine image that is sought is one that is configured specifically for the VNF 406. For example, if the VNF 406 is an SBC, then the virtual machine image is one that is configured to run the VNF component of the SBC.

After the VNF manager 404 verifies that the desired virtual machine image is available, the VNF manager 404 instructs the compute controller 410 to provision the additional virtual machine (e.g. 302-6, FIG. 3) within the cloud computing environment associated with the VNF 404. This is done via signal 422. The compute controller 410 is responsible for managing the plurality of virtual machines running on physical machines. The compute controller 410 may be a component of the Virtual Infrastructure Manager (124, FIG. 1) described above. The compute controller 410 then creates a new virtual machine using the image identified by the image service 408. One example of compute controller is that provided by the OpenStack Foundation under the name Nova™.

After the compute controller 410 creates the new virtual machine, it responds to the VNF manager 404 via signal 424 to provide various data about the newly created virtual machine. Such data may include the network address of the physical server on which the new virtual machine is running as well as any other addressing information that allows the VNF manager 404 to communicate with the new virtual machine. The data may include other information about the virtual machine image itself and other forms of metadata.

According to the present example, the VNF manager 404 sends an instruction via signal 426 to the SDN controller 412. As described above, the SDN controller 412 manages various network components of a network infrastructure. One example of an SDN controller 412 is that provided by the OpenStack Foundation under the name Neutron™. In the present example, the SDN controller 412 manages the network components of a virtual network that is used to interconnect the various components of the VNF 406. In response to the instruction sent via signal 426, the SDN controller 412 establishes connections (e.g. 317, 319, FIG. 3) between the virtual machines that run other VNF components, such as the database and load balancer components, and the new virtual machine. Establishing such connections may include assigning a virtual network address to the new virtual machine. Additionally, establishing the connections may include configuring various virtual network components such as virtual routers and virtual switches. Such virtual network components are thus configured to forward traffic to and from the virtual address assigned to the new virtual machine. The SDN controller 412 also configures the APIs that interact with the VNF manager 404.

The VNF 406 may be one of several VNFs used to provide a telecommunication service. It may be beneficial to notify other VNFs of a change in capacity of the VNF 406. As will be described in further detail below, the VNF manager 404 may also communicate with SDN controllers that are external to the cloud computing environment associated with the VNF 406 and the SDN controller 412.

After the SDN controller 412 establishes the appropriate connections for the new virtual machine, the VNF manager 404 then notifies the EMS 402 that the new virtual machine is available via signal 428. The VNF manager 406 also provides the EMS 402 with various data about the new virtual machine. Such data may include the virtual network address as configured by the SDN controller 412. The data may also include the type of instance used to create the virtual machine.

The EMS 402 then provisions the new VNF component within the VNF 406 at signal 430. In some cases, the software for the VNF component is already part of the virtual machine image. In some cases, however, the EMS 402 may install any software associated with the VNF component on the virtual machine. The new VNF component is now ready to be used within the VNF 406. This increases the total capacity of the VNF 406.

The EMS 402 then notifies the VNF manager 404 that the provisioning of the new VNF component is complete via signal 432. The VNF manager 404 can then manage the new VNF component like the other VNF components that are currently operating. The VNF manager 404 also notifies the load balancer 414, via signal 434, that there is a new VNF component to which demand can be distributed. Thus, when the load balancer 414 receives a request for service, it can forward that request to any one of the service components, including the newly established VNF component.

A similar process is used to remove a VNF from service when demand for services drops below a defined threshold of total capacity. Specifically, the EMS 402 may determine that demand has dropped below the defined threshold and notify the VNF manager accordingly. The VNF manager 404 can then instruct the compute controller 410 to take down the virtual machine associated with one of the VNF components. The VNF manager 404 can also instruct the SDN controller 412 to take down connections to the virtual machine. The SDN controller 412 can then reconfigure the network accordingly.

Figure 5:
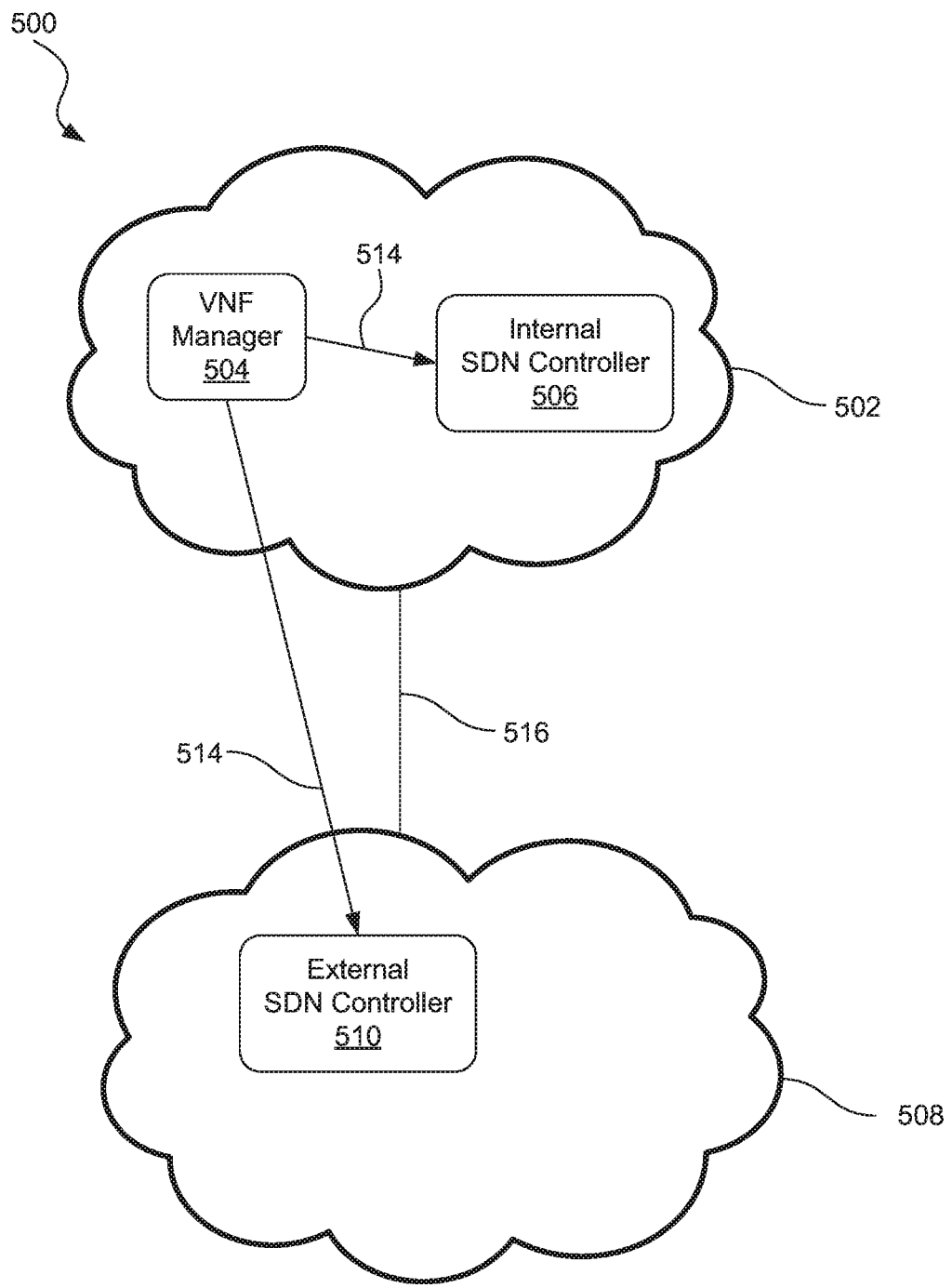
FIG. 5 is a diagram showing communication between SDN controllers, according to one example of principles described herein.

FIG. 5 is a diagram showing communication between SDN controllers 506, 510. As described above, when the VNF manager 504 instructs the SDN controller 506 to connect the new virtual machine to the virtual network, the VNF manager 504 may also communicate with an external SDN controller 510. A telecommunication service that utilizes NFV may include several VNFs that together provide the telecommunication service. These VNFs may be associated with different geographic regions. For example, a first VNF may be associated with a first geographic location that is associated with a first cloud computing environment 502. A second VNF is associated with a second cloud computing environment 508 at a second geographic location. In one example, the different geographic locations are different cities, and each cloud computing environment 502, 508 is implemented in a physically separate group of computers at its respective geographic location.

When the VNF manager 504 for the VNF within the first cloud computing environment instructs the internal SDN controller 506 to establish new connections (e.g. 317, 319, FIG. 3) to the new virtual machine, the VNF manager 504 may also notify an external SDN controller 510 associated with the second cloud computing environment. This is done via signal 514. The VNF manager 504 may communicate with the external SDN controller 510 using a variety of protocols, including OpenFlow.

It is beneficial to inform the external SDN controller 510 that the VNF managed by the VNF manager 504 has increased capacity. The external SDN controller 510 may thus make adjustments to the network components it controls in order to allow more traffic to be passed along line 516 between the different cloud computing environments.

Figure 6:
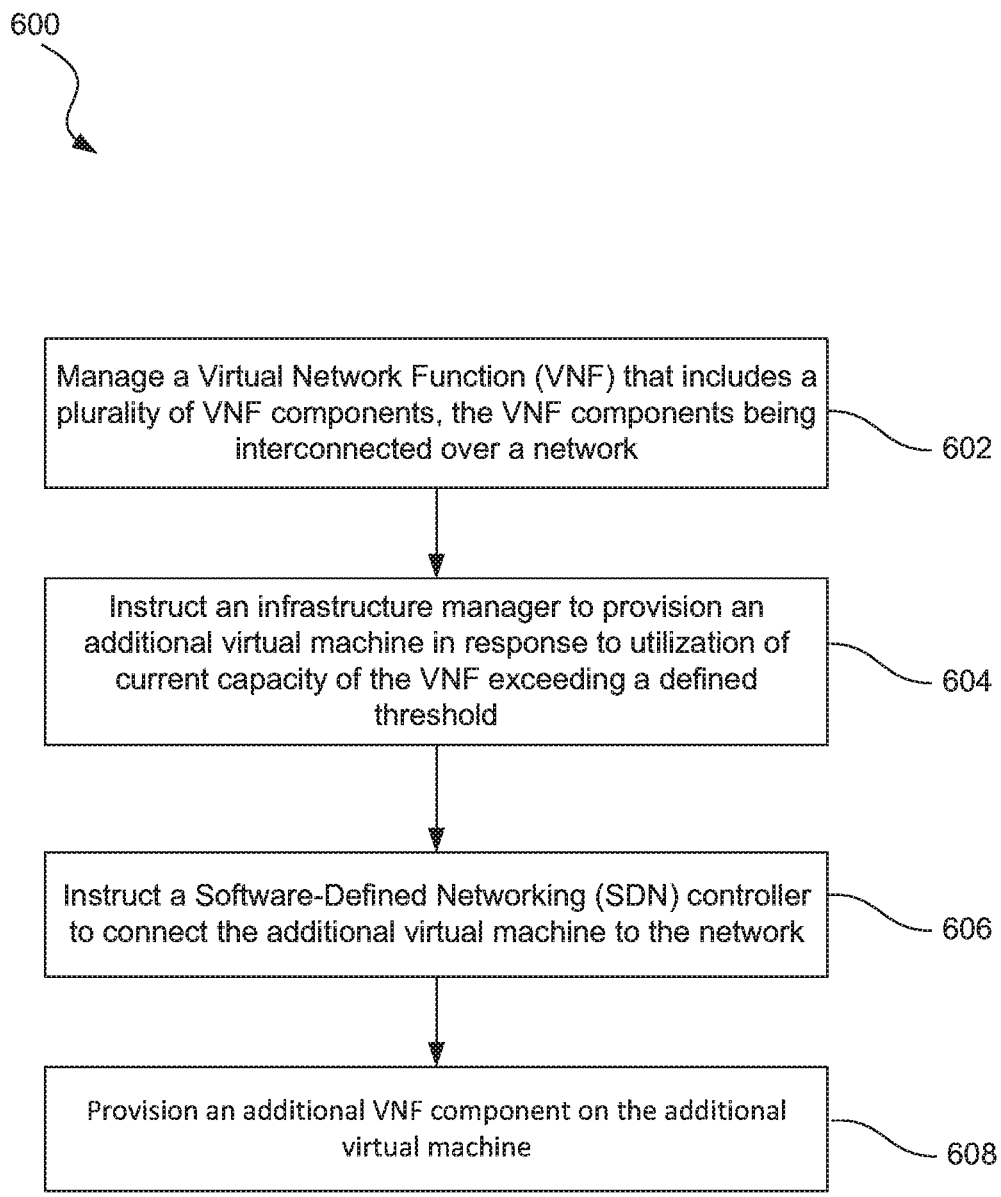
FIG. 6 is a flowchart showing an illustrative method for establishing network connections to dynamically created VNF components, according to one example of principles described herein.

FIG. 6 is a flowchart showing an illustrative method for establishing network connections to dynamically created VNF components. According to the present example, the method 600 includes a step 602 for managing a VNF that includes a plurality of VNF components, the VNF components being interconnected over a network. This step 602 may be performed by a VNF manager (e.g., 126, FIG. 1). The network may be a virtual network that interconnects the VNF components.

The method 600 further includes a step 604 for instructing a virtual infrastructure manager (e.g. 124, FIG. 1) to provision an additional virtual machine in response to utilization of current capacity of the VNF exceeding a defined threshold. This step corresponds to signal 422 in FIG. 4. In one example, if utilization of the VNF reaches 85 percent of total capacity, this can trigger the VNF manager to instruct the virtual infrastructure manager to provision an additional virtual machine.

The method 600 further includes a step 606 for instructing an SDN controller (e.g. 130, FIG. 1) to connect the additional virtual machine to the network. This step 606 corresponds to signal 426 in FIG. 412. More specifically, the SDN controller connects the new virtual machine to the virtual network associated with the VNF and thus establishes connections between the new virtual machine and other virtual machines that run other components of the VNF.

The method 600 further includes a step 608 for provisioning an additional VNF component on the additional virtual machine. This step 608 corresponds to signal 430 in FIG. 4. The additional VNF component increases the total capacity of the VNF. Thus, the VNF adapts to changing demand for services. Using principles described herein, a VNF can more efficiently adapt to demand for services. Specifically, by using SDN to establish virtual network connections to newly established VNF components, the newly established VNF components can be more efficiently brought to a state at which they can operate within the VNF and thus provide additional capacity. As described above, a similar process can be used to reduce the number of VNF components.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   with a Virtual Network Function (VNF) manager that manages a VNF that includes plurality of VNF components running on a plurality of virtual machines, determining that an additional VNF component should be provisioned on an additional virtual machine, wherein the plurality of VNF components includes independently scalable service VNF components, database VNF components, and load balancing VNF components;
   in response to the determining that the additional VNF component should be provisioned, instructing a compute controller to provision the additional virtual machine;
   instructing a Software-Defined Networking (SDN) controller to connect the additional virtual machine to a network that interconnects the VNF components by establishing connections between the additional virtual machine and virtual machines running different types of VNF components than the additional VNF component; and
   provisioning the additional VNF component on the additional virtual machine.

2. The method of claim 1, wherein determining that the additional VNF component should be provisioned comprises receiving data from an Element Management System (EMS) associated with the VNF, or receiving data directly from the VNF.

3. The method of claim 2, wherein the EMS is configured to send the data in response to detecting a change in utilization of the VNF.

4. The method of claim 2, wherein configuring the additional VNF component comprises providing characteristic information about the additional virtual machine to the EMS.

5. The method of claim 4, wherein the characteristic information includes a network address of the additional virtual machine.

6. The method of claim 1, further comprising, utilizing a referenced virtual machine image, the virtual machine image comprising the additional VNF component.

7. The method of claim 1, further comprising, with the compute controller, provisioning the additional virtual machine.

8. The method of claim 1, wherein the SDN controller manages the network, the network being associated with a cloud computing environment.

9. The method of claim 8, further comprising, with the VNF manager, sending information related to an increase in capacity to an external SDN controller, the external SDN being external to the cloud computing environment.

10. The method of claim 1, wherein the VNF components include a database, a load balancer, and a plurality of service instances.

11. A method comprising:
  managing a Virtual Network Function (VNF) that includes a plurality of VNF components, the VNF components being interconnected over a network, wherein the plurality of VNF components includes independently scalable service VNF components, database VNF components, and load balancing VNF components;
  in response to utilization of current capacity of the VNF exceeding a defined threshold, instructing a compute controller to provision an additional virtual machine for an additional VNF component;
  instructing a Software-Defined Networking (SDN) controller to connect the additional virtual machine virtual machines running different types of VNF components than the additional VNF component; and
  provisioning the additional VNF component on the additional virtual machine.

12. The method of claim 11, further comprising, with the SDN controller, establishing a connection between the additional virtual machine and a virtual machine that runs a database VNF component.

13. The method of claim 11, further comprising, with the SDN controller, establishing a connection between the additional virtual machine and a virtual machine that runs a load balancing VNF component.

14. The method of claim 13, wherein the load balancing VNF component acts as an access point between the network and an access network.

15. The method of claim 11, wherein the additional VNF component creates an increased capacity of the VNF.

16. The method of claim 15, further comprising, notifying an external SDN controller of the increased capacity.

17. The method of claim 11, further comprising, in response to utilization of current capacity of the VNF dropping below a defined threshold, instructing the compute controller to release one of the plurality of VNF components.

18. A system comprising:
  a processor; and
  a memory comprising machine readable instructions that when executed by the processor, cause the system to:
    manage a Virtual Network Function (VNF) that includes a plurality of VNF components, the VNF components being interconnected over a network, wherein the plurality of VNF components includes independently scalable service VNF components, database VNF components, and load balancing VNF components;
    instruct a compute controller to provision an additional virtual machine in response to utilization of current capacity of the VNF exceeding a defined threshold, the additional virtual machine being for an additional VNF component;
    instruct a Software-Defined Networking (SDN) controller to connect the additional virtual machine virtual machines running different types of VNF components than the additional VNF component; and
    provision the additional VNF component on the additional virtual machine.

19. The system of claim 18, wherein the network comprises a virtual network that interconnects the VNF components.

20. The system of claim 18, wherein the VNF comprises one of: a Session Border Controller (SBC), an Internet Protocol (IP) Multimedia Subsystem (IMS) network function, and a telephony application server.

* * * * *